United States Patent [19]
Yamashita et al.

[11] Patent Number: 5,896,363
[45] Date of Patent: Apr. 20, 1999

[54] TRAY LOADING DEVICE OF A CD PLAYER

[75] Inventors: Toshirou Yamashita; Shigeo Maruyama; Tatsuya Yanagisawa; Tomomichi Kimura; Taichi Sato; Takashi Ota, all of Saitama-ken, Japan

[73] Assignee: Pioneer Electronic Corporation, Tokyo, Japan

[21] Appl. No.: 08/775,277

[22] Filed: Dec. 31, 1996

Related U.S. Application Data

[63] Continuation of application No. 08/540,831, Oct. 11, 1995, abandoned.

[30] Foreign Application Priority Data

Oct. 17, 1994 [JP] Japan .................. 6-251083

[51] Int. Cl.$^6$ .................................................... G11B 17/04
[52] U.S. Cl. ........................ 369/192; 369/178; 369/36
[58] Field of Search ........................... 369/192, 191, 369/178, 36, 34; 360/98.04; 414/225; 294/15, 93

[56] References Cited

U.S. PATENT DOCUMENTS

| | | | |
|---|---|---|---|
| 4,865,375 | 9/1989 | Laub et al. | 294/93 X |
| 5,036,503 | 7/1991 | Tomita | 369/36 |
| 5,123,000 | 6/1992 | Fitzgerald et al. | 369/191 X |
| 5,215,424 | 6/1993 | Gearin et al. | 294/93 X |
| 5,274,620 | 12/1993 | Sipos | 369/192 X |
| 5,400,310 | 3/1995 | Morikawa et al. | 360/92 X |

*Primary Examiner*—Stuart S. Levy
*Assistant Examiner*—William R. Korzuch
*Attorney, Agent, or Firm*—Nikaido, Marmelstein, Murrary & Oram LLP

[57] ABSTRACT

A tray loading arm is provided for reciprocating between a magazine and a reproducing device. A pin is provided on the tray loading arm, and a tray guide device is operatively engaged with the pin so as to be moved together with the pin. The tray guide device has a guide plate to be engaged with the tray for moving the tray, and a slide plate to be engaged with the tray for keeping engagement of the guide plate with the tray during movement of the tray.

6 Claims, 11 Drawing Sheets

TRAY LOADING DEVICE OF A CD PLAYER

This application is a continuation of application Ser. No. 08/540,831, filed Oct. 11, 1995, now abandoned.

BACKGROUND OF THE INVENTION

The present invention relates to a tray loading device of a CD player having a magazine which stores a plurality of trays each of which holds a compact disc (CD).

Recently, a CD player having a magazine has been provided for continuously reproducing a plurality of CDs.

In a car CD player, a tray loading device is designed so as to be vertically moved along the magazine for loading a selected tray in the magazine. The tray is drawn by the device from the magazine in the horizontal direction to feed the CD on the tray to a playback position.

In such a conventional loading device, a device having an arm rotating mechanism or a rack relay mechanism has been proposed.

FIG. 11 shows a car CD player 10 having a conventional tray loading device. A car CD player 10 has a magazine mounting section 20 having a magazine 21 and a reproducing section 30 having a reproducing device 50. The reproducing device 50 comprises a frame 42 on which a turntable 40 driven by a spindle motor 41 is rotatably mounted. A tray loading device 100 having a tray guide 111 is mounted on a frame 60 which is provided on a lower portion of the frame 42 and vertically movable by an arm 61 operated by a motor (not shown). A damper 70 is also mounted on the frame 60 for clamping a CD on the turntable 40.

FIGS. 12 and 13 show the tray loading device 100. A drive gear 102 secured to a rotating shaft of a motor (not shown) is engaged with a gear portion 101a of a mode control ring 101 for rotating the ring about a center 0. The gear portion 101a is further engaged with a pinion 103 which is engaged with a gear 105 of a gear arm 104. The gear 105 is rotatably mounted on a shaft 105a to which a fixed gear 106 is secured. The gear 106 is engaged with an intermediate gear 107 rotatably mounted on a shaft 104a secured to the gear arm 104 at a central portion thereof. The gear 107 is engaged with a gear 108 rotatably mounted on a shaft 104b secured to an end portion of the arm 104.

On the shaft 104b, a tray loading arm 109 is pivotally mounted at a base thereof. The arm 109 is provided with a holding member 114 rotatably mounted on a pin 113 secured to an end portion thereof. The tray guide 111 is integrally formed on the holding member 114 to be engaged with a notch 91 of a tray 90. A pair of guide members 110 are formed on an underside of the guide 111 and slidably mounted on a guide shaft 112.

As shown in FIG. 13a, the length e between the shafts 105a and 104b is equal to the length e between the shaft 104b and the pin 113. Thus, the gear arm 104 and the tray loading arm 109 approximately have the same length. Furthermore, the shaft 112 is parallel to the line H connecting the shafts 105a, 104b and the pin 113 positioned on a straight line.

The operation of the tray loading device 100 will be described with reference to FIGS. 13a to 13d.

When the tray 90 is pushed into the magazine, a side 111a of the guide 111 is engaged with an inside wall 92 of the notch 91 as shown in FIG. 13a. Under such a condition where the side 111a is abuts on the wall 92, the loading device 100 can not be smoothly vertically moved. Therefore, as described later, at the selection of one of trays in the magazine, the loading device is positioned as shown in FIG. 13d. Namely, both sides 111a and 111b of the tray guide 111 are disengaged from inside walls 92 and 93 of the notch 91.

When one of the trays in the magazine 21 is selected, the tray loading device 100 is vertically moved in the player along the trays in the magazine to the selected tray. Since the guide 111 does not touch the walls 92 and 93 of the notch 91, the device 100 can be smoothly moved.

In order to draw the selected tray from the magazine, the motor is driven to rotate the gear 102 in the clockwise direction shown by an arrow of FIG. 12, so that the mode control ring 101 is rotated in the clockwise direction to rotate the pinion 103 in the clockwise direction. The gear 105 of the gear arm 104 engaged with the pinion 103 is rotated in the counterclockwise direction. Thus, the arm 104 is moved in the counterclockwise direction about the shaft 105a. When the arm 104 is moved, the gear 107 rotatably mounted on the arm 104 is revolved around the gear 106 to be rotated in the counterclockwise direction. The gear 108 engaged with the gear 107 is rotated in the clockwise direction to move the arm 109 in the clockwise direction. At the position of FIG. 13a, the axes of the arms 104 and 109 are brought into line so that the tray guide 111 is engaged with the wall 93 of the notch 91 of the tray 90.

As shown in FIG. 13b, when the ring 101 is further rotated, the arm 104 is moved in the counterclockwise direction through the pinion 103 and the gear 105. The arm 109 is moved in the clockwise direction through the gears 107 and 108. Thus, the tray guide 111 mounted on the pin 113 of the arm 109 is moved along the guide rail 112 so that the selected tray 90 is gradually drawn from the magazine.

In accordance with the gear ratio of the gear 106 to the gear 108, if the arm 104 is rotated at an angle θ with the line H, the arm 109 is rotated at an angle 2θ with the axis of the arm 104 in the opposite angular direction.

When the arm 104 is overlapped on a perpendicular axis S and the shaft 104b of the arm 104 coincides with the axis S, the arm 109 is overlapped on the arm 104 and the pin 113 of the arm 109 coincides with the shaft 105a of the gear 105 because the arms 104 and 109 are the same length. The gear 107 is further revolved around the gear 106 so that the arm 109 is crossed over the arm 104 and moved to the left as shown in FIG. 13c. When the arms 104 and 109 are brought into line, the tray 90 is completely fed to the reproducing section 30 and further loaded on the turntable 40.

In order to return the tray to the magazine when selecting the other tray, the ring 101 is rotated in the counterclockwise direction through the gear 102 and motor. The gear 105 is rotated in the clockwise direction to move the arm 104 in the clockwise direction. The gear 108 is rotated in the counterclockwise direction to move the arm 109 in the counterclockwise direction. The tray guide 111 engaged with the notch 91 of the tray is abutted on the wall 92 so as to push the tray to the magazine as the arms 104 and 109 are moved. The return operation is continued in a reverse order.

When the arms 104 and 109 are moved to the positions as shown in FIG. 13a, the tray 90 is returned in the magazine. However, the ring 101 is further rotated a predetermined small angle in the counterclockwise direction to move the arm 104 in the clockwise direction. Thus, the shaft 104b is positioned slightly lower than the line H to move the pin 113 as shown in FIG. 13d. The guide 111 is positioned in a center of the notch 91 such that a gap is provided between the guide 111 and walls 92 and 93. Consequently, the device 100 can be smoothly moved at the next selection of the tray.

However, as noted earlier, the notch 91 of the tray 90 has a width enough to position the tray guide 111 in the center thereof so as to provide gaps between the guide 111 and walls 92 and 93. Accordingly, when the tray 90 is drawn from the magazine 21 or returned in the magazine, the guide 111 is engaged with either of the walls 92 or 93, thereby making clattering noises.

SUMMARY OF THE INVENTION

An object of the present invention is to provide a tray loading device which may prevent clattering noises of a tray during a loading operation thereof.

According to the present invention, there is provided a tray loading device of a CD player having a reproducing device, a magazine storing a plurality of trays each of which holds a CD, the loading device comprising a tray loading arm reciprocating between the magazine and the reproducing device, a pin provided on the tray loading arm, a tray guide device operatively engaged with the pin so as to be moved together with the pin, the tray guide device having a guide plate to be engaged with the tray for moving the tray, and a slide plate to be engaged with the tray for keeping engagement of the guide plate with the tray during movement of the tray.

The guide plate is provided to be engaged with a wall of a notch of the tray, and the slide plate is slidably mounted on the guide plate to be engaged with the wall of the notch. A spring is provided for urging the slide plate to the wall, and stopping means is provided to stop the slide plate at a portion apart from the wall only when the tray is in the magazine.

Other objects and features of this invention will become understood from the following description with reference to the accompanying drawings.

DETAILED DESCRIPTION OF THE PREFERRED EMBODIMENT

Figure 1:
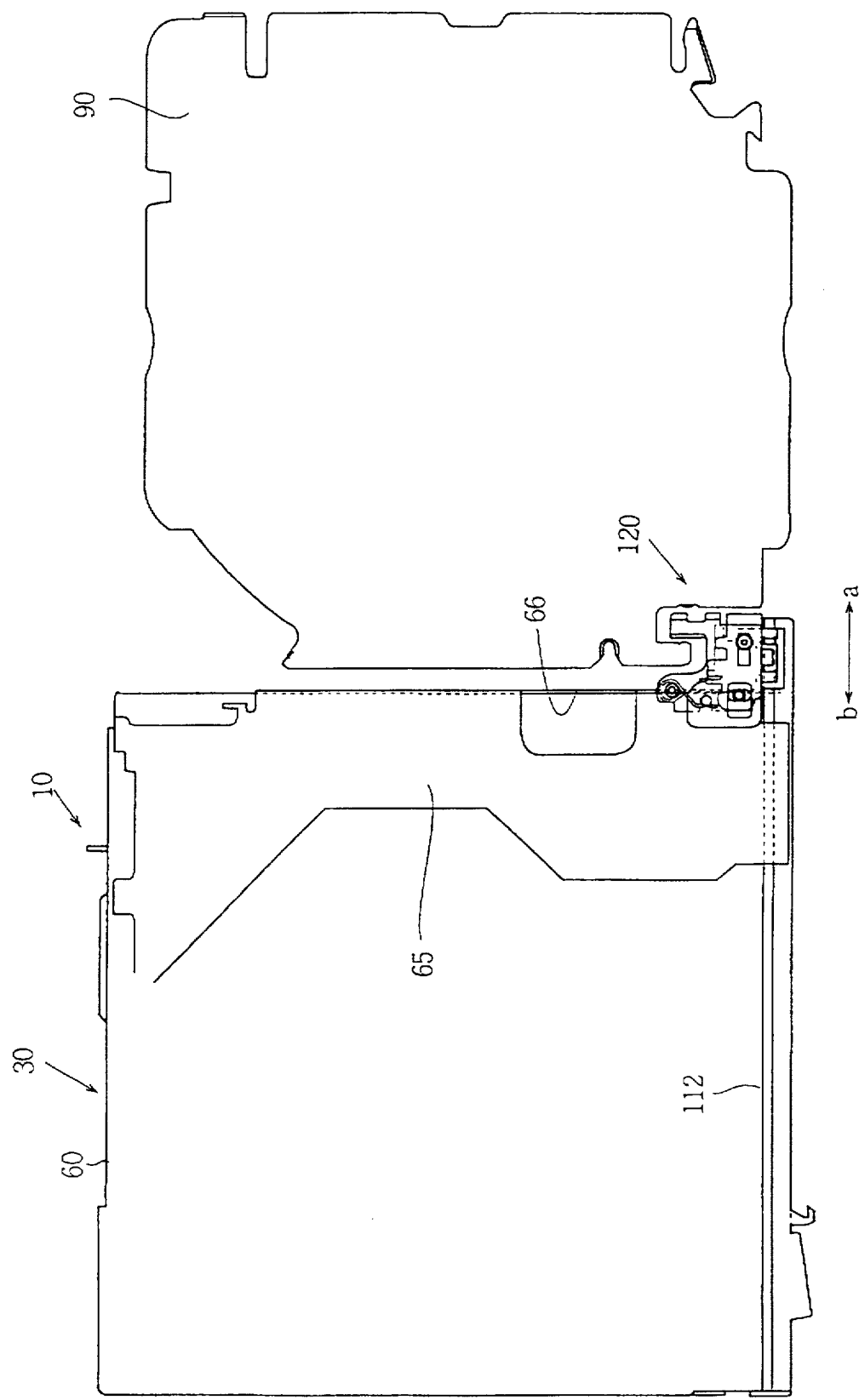
FIG. 1 is a schematic plan view showing a CD player to which the present invention is applied.

Referring to FIG. 1 showing a CD player having a tray loading device of the present invention, the parts of which are the same as the conventional structures are identified with the same reference numerals as FIGS. 11, 12 and 13a to 13d.

A tray guide device 120 is connected to the tray loading device 100 (not shown) to be moved along the guide shaft 112 provided in the frame 60 (FIG. 1) of the reproducing section 30.

Figure 2:
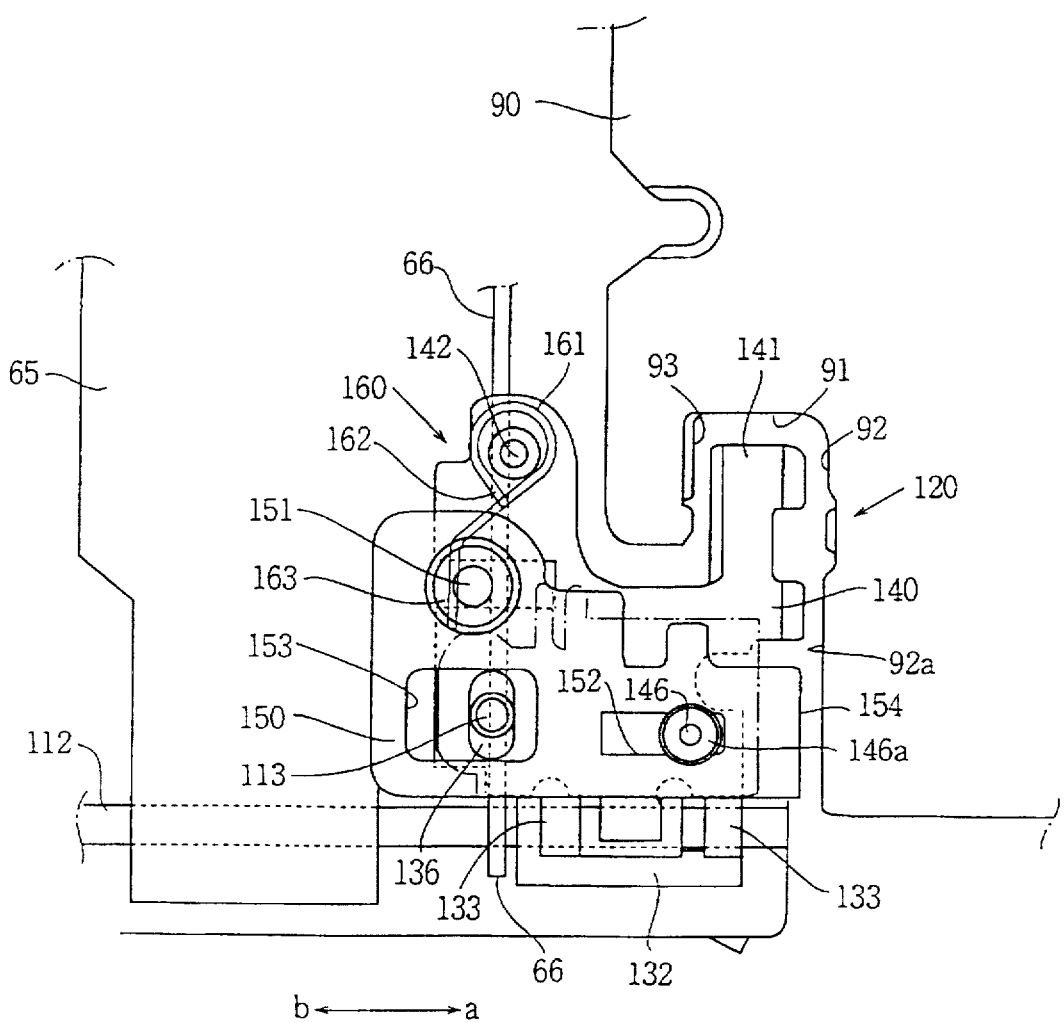
FIG. 2 is an enlarged plan view showing a tray guide device of a tray loading device according to the present invention.
Figure 3:
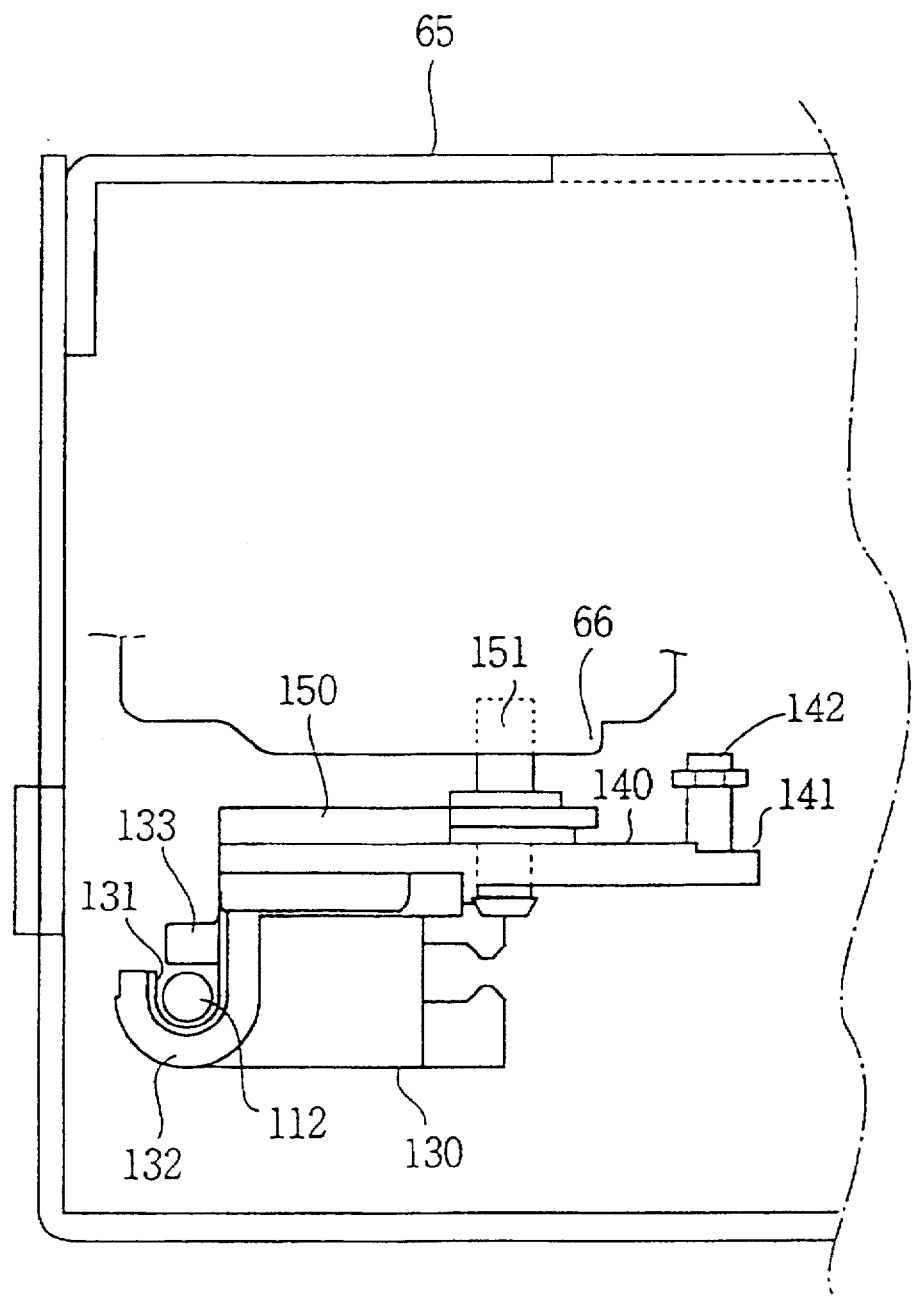
FIG. 3 is a schematic side view showing the tray guide device.
Figure 4:
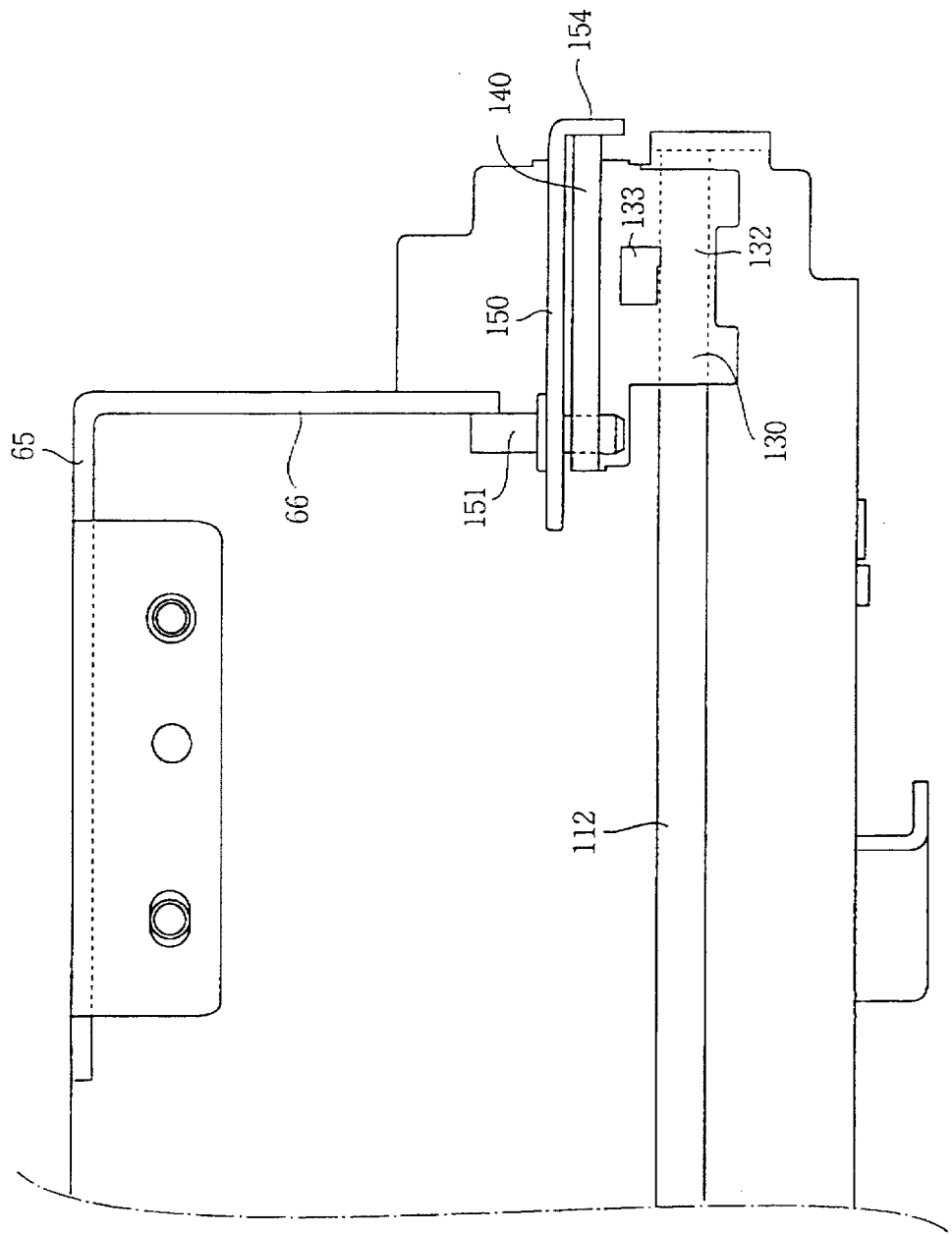
FIG. 4 is another side view of the guide device.

Referring to FIGS. 2 to 4 showing the tray guide device 120, the guide device 120 comprises a slide base 130 slidably engaged with the guide shaft 112, a guide plate 140 mounted on the slide base 130 for guiding the tray 90, and a slide plate 150 slidably mounted on the guide plate 140. As shown in FIG. 2, the frame 60 has a bracket 65 having a side plate 66 and provided adjacent to the guide device 120 at a tray selecting position of the guide device.

Figure 5:
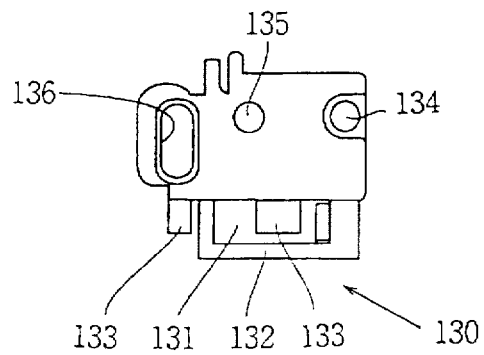
FIG. 5 is a plan view showing a slide base of the guide device.

Referring to FIG. 5, the slide base 130 comprises a projected guide portion 132 having a J-shape in section (FIG. 3). The guide portion 132 has an inner guide groove 131 slidably engaged with a lower portion of the guide shaft 112. A guide stopper 133 is projected on the guide groove 131 to be engaged with an upper portion of the guide shaft 112, thereby preventing the guide portion 132 from removing from the guide shaft 112.

The slide base 130 further has a pair of pins 134 and 135 to be engaged with a lower portion of the slide plate 150 at end portions thereof so as to form a slight gap between the guide plate 140 and the slide plate 150. An elongated hole 136 is provided for inserting the pin 113 secured to the tray loading arm 109 of the loading device 100.

Figure 6:
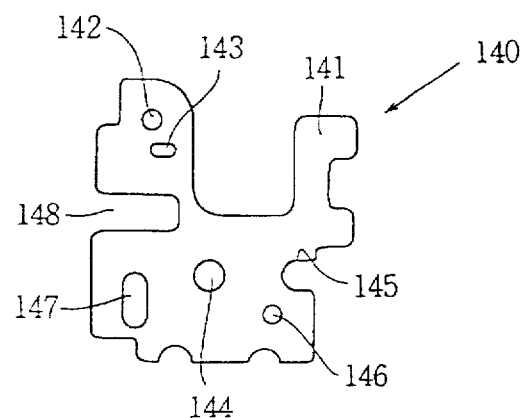
FIG. 6 is a plan view showing a guide plate of the guide device.

Referring to FIG. 6, the guide plate 140 has a tray guide portion 141 engaged with the wall 93 of the notch 91 of the tray 90, a pin 142 on which an end of a spring 160 (FIG. 2) is engaged, a hole 144 engaged with the pin 135 of the slide base 130, and a notch 145 engaged with the pin 134 of the slide base 130. Thus, the guide plate 140 is secured to the slide base 130. The pin 113 engaged with the hole 136 of the slide base 130 is inserted into an elongated hole 147. The guide plate 140 further has a hole 143, a pin 146 and a notch 148, which will be described hereinafter.

Figure 7:
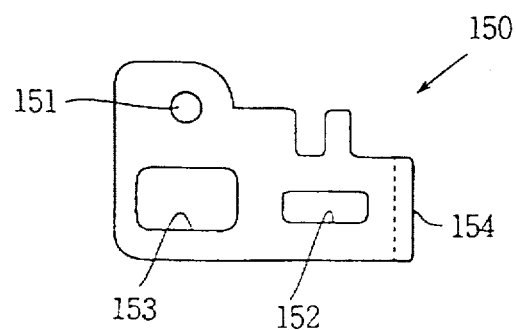
FIG. 7 is a plan view showing a slide plate of the guide device.

Referring to FIG. 7, the slide plate 150 has a pin 151 projected on upper and lower portions thereof, a rectangular hole 152 in which the pin 146 of the guide plate 140 is inserted, and a rectangular hole 153 formed corresponding the the holes 136 and 147 of the slide base 130 and the guide plate 140 for the pin 113. A bent portion 154 (FIG. 4) is provided to be engaged with a lower wall portion 92a of the tray 90.

A shown in FIGS. 3 and 4, a lower portion of the pin 151 is inserted into the notch 148 of the guide plate 140. An upper portion of the pin 151 is engaged with the side plate 66 of the bracket 65.

The pin 146 inserted into the hole 152 has a head portion 146a. The diameter of the head portion 146a is slightly larger than the width of the hole 152, so that the slide plate 150 is prevented from removing from the guide plate 140. The pin 113 is inserted in the hole 153 through the holes 136 and 147.

Due to the pins 146 and 151 engaged with the hole 152 and the notch 148 respectively, the slide plate 150 is slidable on the guide plate 140 in a stable state in the directions a and b.

As shown in FIG. 2, the spring 160 has a rounded portion 161 mounted around the pin 142 of the guide plate 140, a lower end 162 inserted into the hole 143 of the plate 140 for preventing the spring 160 from removing from the plate 140.

and an extending end 163 engaged with the pin 151 of the slide plate 150. Thus, the slide plate is urged in the direction a by the spring force. However, in the tray selecting position, the pin 151 is engaged with the side plate 66 against the spring force.

Figure 8:
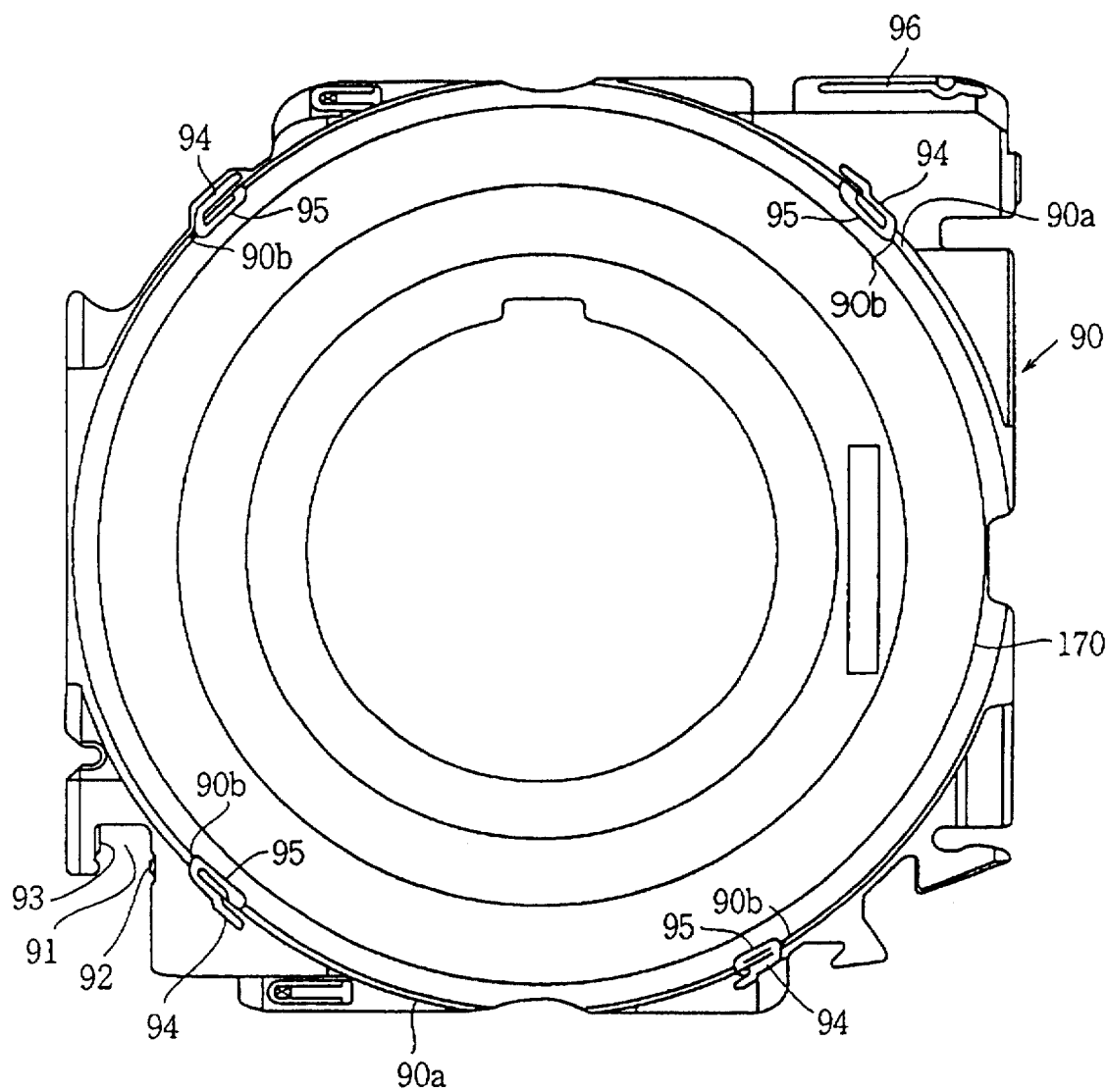
FIG. 8 is a plan view showing a try for a CD.

FIG. 8 shows the tray 90 on which a CD 170 is mounted. The tray 90 has ribs 90a formed on the outer periphery thereof for surrounding the CD with a predetermined gap between the rib and the CD. On the ribs 90a, four notches 90b are formed and a shock absorbing members 94 is secured to the wall of each notch 90b. The shock absorbing member 94 has a resilient portion 95 enlargeable with the CD. In a normal mounting state, the CD 170 is adapted to be disengaged from the absorbing members 94.

The tray 90 further has a shock absorbing member 96 provided on the outermost portion thereof for absorbing a shock when the tray impacts on a wall of an opening of the magazine.

Figure 9:
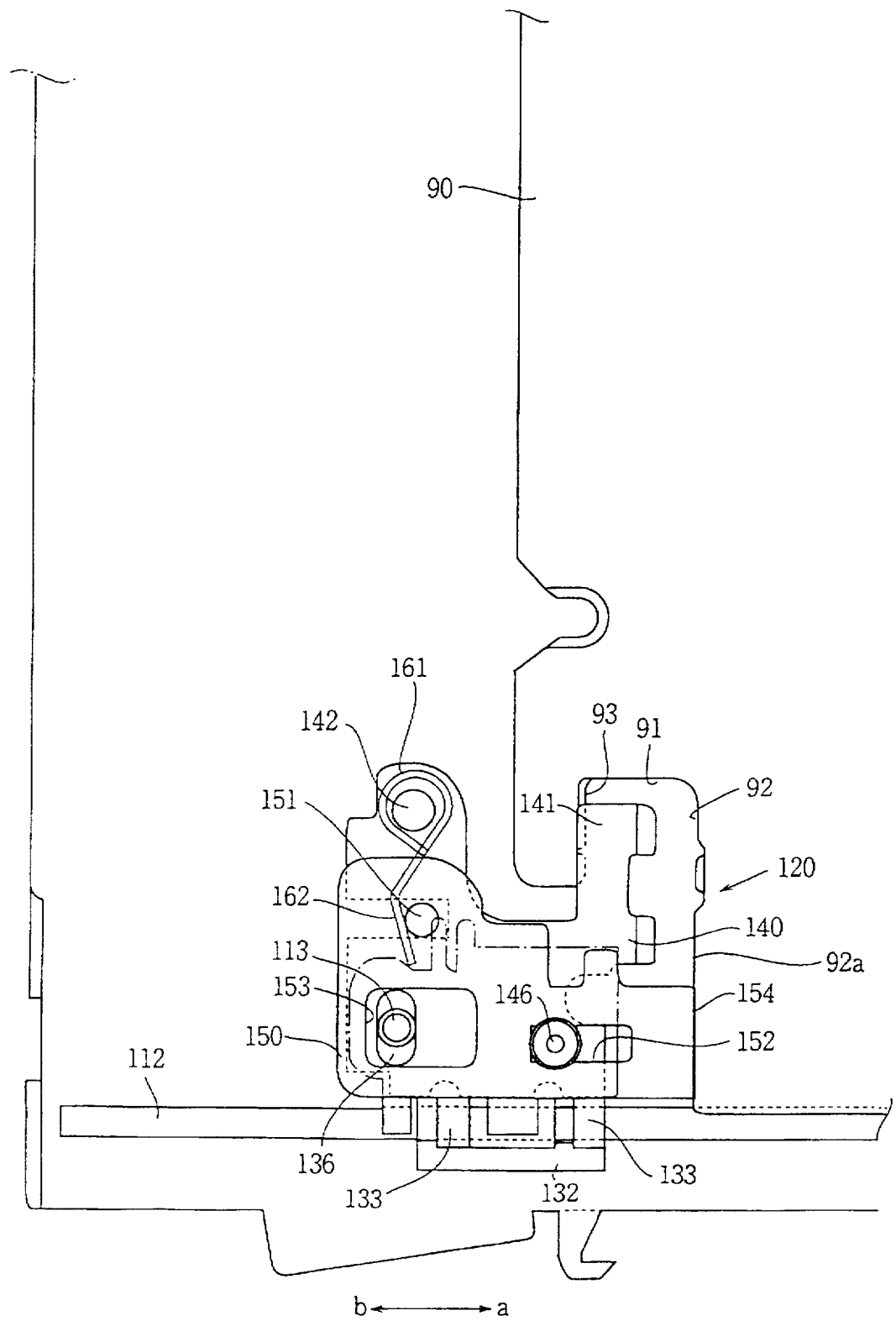
FIG. 9 is an enlarged plan view showing the guided device in an operation state.

The operation of the guide device 120 will be described with reference to FIGS. 9 and 10.

At the tray selecting position, the guide device 120 is positioned in the state shown in FIG. 2. Since the pin 151 of the slide plate 150 is engaged with the side plate 66 of the bracket 65, the bent portion 154 of the slide plate 150 is disengaged from the wall portion 92a, while the guide portion 141 of the guide plate 140 is positioned in the center of the notch 91 such that the gaps are provided between the guide portion 141 and walls 92 and 93. Consequently, the guide device 120 can be vertically moved by the movement of the frame 60 for the selection of the tray without contacting with the tray 90.

When one of the trays in the magazine is selected, the tray loading device 100 is operated to start for drawing the selected tray from the magazine. Namely, the mode control ring 101 is rotated to rotate the gear arm 104 and the tray loading arm 109. Thus, the guide device 120 connected to the pin 113 of the arm 109 is moved along the guide shaft 112 in the direction b, so that the slide base 130 and the guide plate 140 are moved to the direction. Therefore, the guide portion 141 engages with the wall 93 of the notch 91 of the tray 90. Consequently, the tray 90 begins to move in the direction b. Then, the pin 113 engages with the wall of the hole 153 to move the slide plate 150. Thus, the pin 151 of the slide plate 150 is disengaged from the side plate 66 of the bracket 65. Since the end 163 of the spring 160 engages with the pin 151, the slide plate 150 is slid on the guide plate 140 in the direction a by the spring force. Hence, the bent portion 154 is engaged with the lower wall portion 92a of the tray 90. Thus, as shown in FIG. 9, the tray 90 is firmly held by the guide portion 141 and the bent portion 154 of the guide device 12 without play and clattering noises.

The tray 90 engaged with the guide device 120 is drawn from the magazine and moved in the direction b through the loading device 100 in the same manner as the conventional operation.

If the tray is impacted on the wall of the magazine when drawn from the magazine, the CD 170 may be moved on the tray. However, the CD 170 engages with the resilient portion 95 of the shock absorbing member 94 of the rib 90a. Thus, an impact against the CD is prevented to prevent impact noise.

Figure 10:
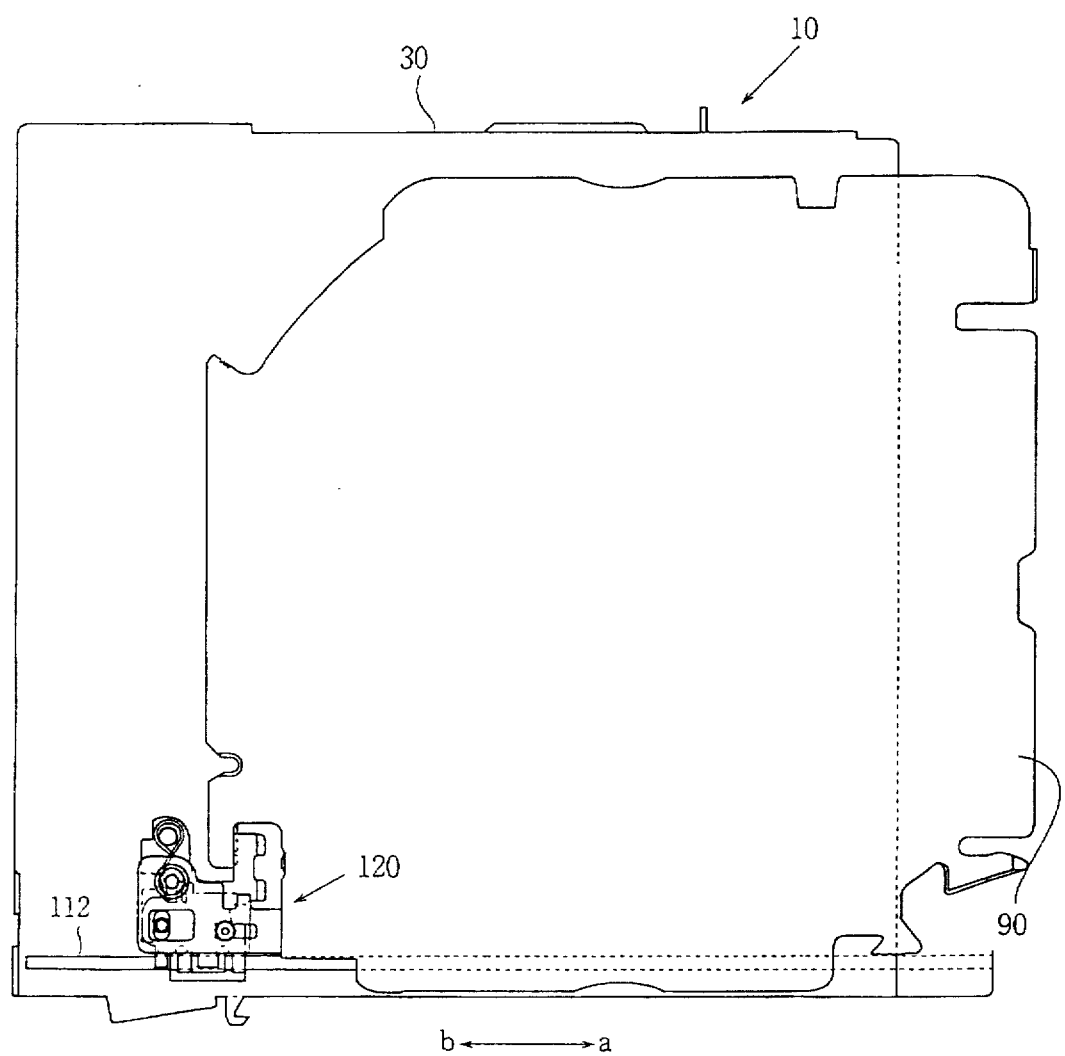
FIG. 10 is a plan view showing the operation of the guide device.
Figure 11:
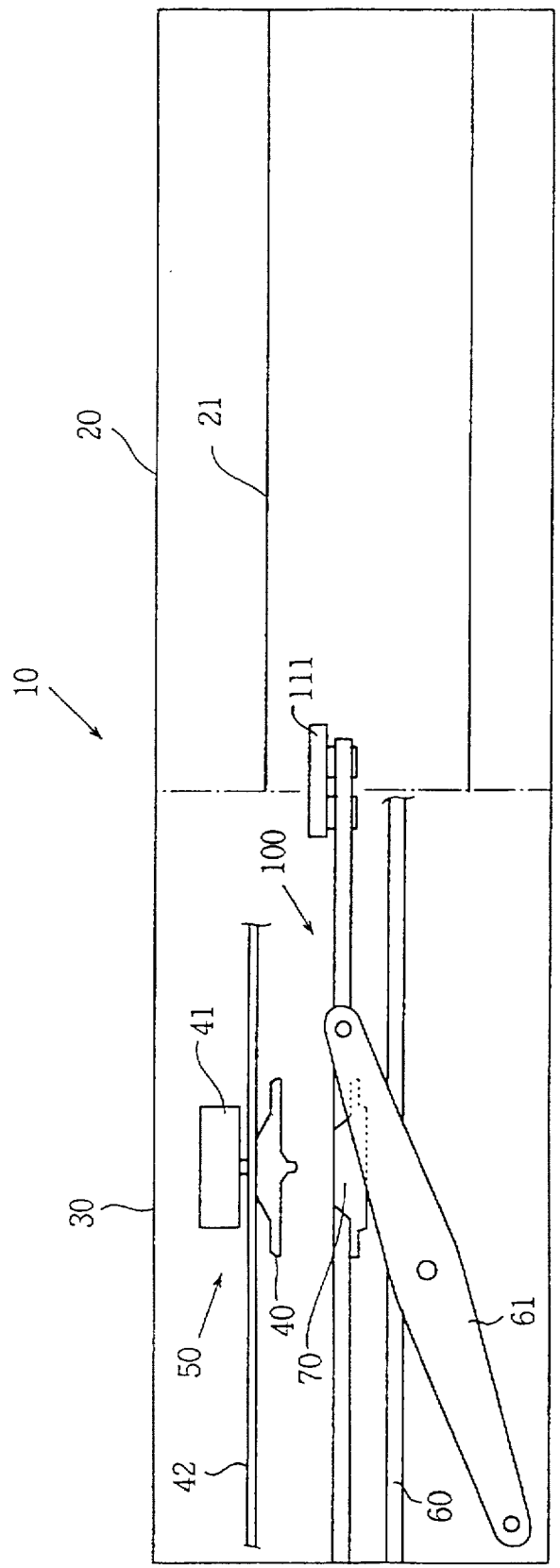
FIG. 11 is a sectional side view schematically showing a conventional CD player.
Figure 12:
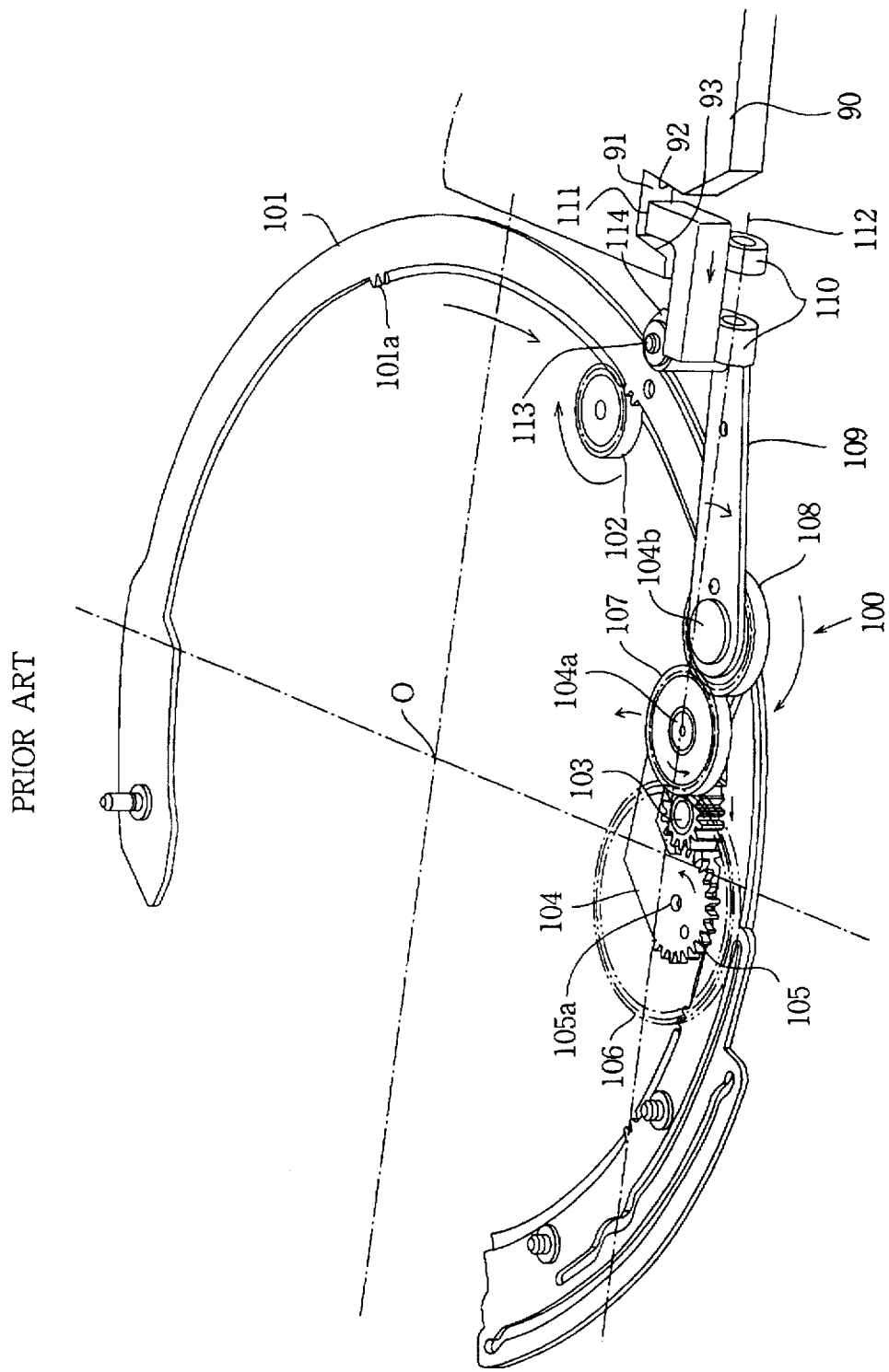
FIG. 12 is a perspective view showing a conventional tray loading device.

When the mode ring 101 is further rotated and the arms 104 and 109 are come into line, the tray 90 is completely fed to the reproducing section 30 as shown in FIG. 10.

In order to return the tray to the magazine, the return operation is continued in the reverse order. Since the tray 90 is still held by the guide portion 141 and the bent portion 154 of the guide device 120, the tray is smoothly moved in the direction a.

As hereinbefore described, impacts against the CD 170 due to the loading of the tray 90 are absorbed by the absorbing members 94 of the tray.

Figure 13:
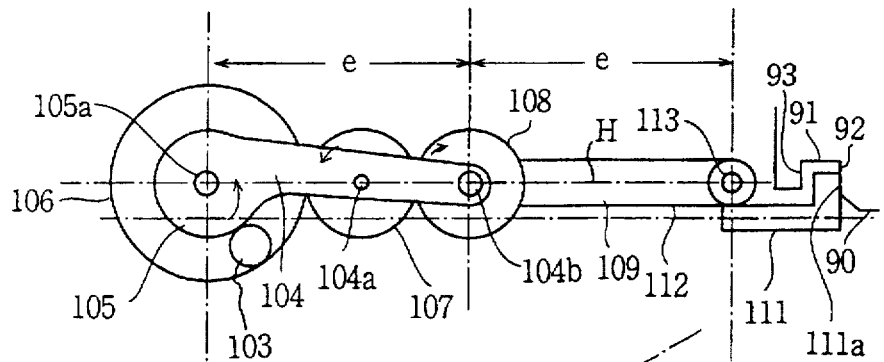
FIGS. 13a, 13b, 13c and 13d are explanatory plan views showing the operation of the conventional loading device.
Figure 13:
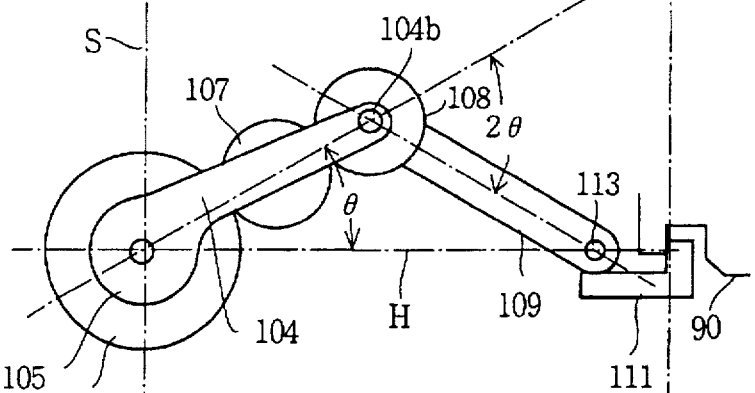
Figure 13:
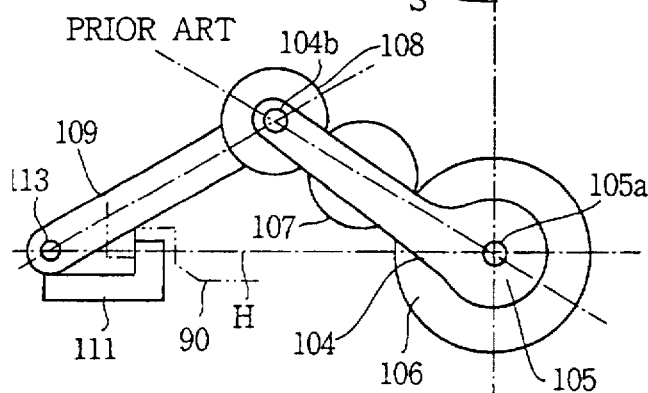
Figure 13:
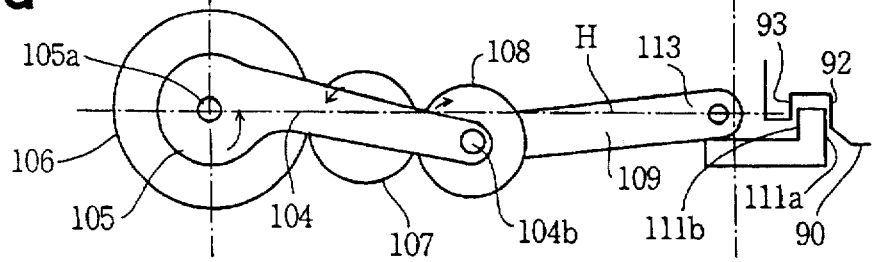

When the mode ring 101 is rotated in the counterclockwise direction, and the arms 104 and 109 are moved to the positions as shown in FIG. 13a, the tray 90 is returned in the magazine. When the pin 151 of the slide plate 150 is engaged with the side plate 66 of the bracket 60 against the spring force, the slide plate is stopped. Thus, the bent portion 154 is disengaged from the tray.

In this state, the mode ring 101 is further rotated as aforementioned in FIG. 13d, so that the slide base 130 is further moved in the direction a, and hence the guide plate 140. Thus, the guide portion 141 of the guide plate 140 is disengaged from the wall 93 and positioned in the center of the notch 91 as shown in FIG. 2.

If the tray 90 is impacted on the wall of the magazine when returned in the magazine, the shock absorbing member 96 absorbs the impact.

In accordance with the present invention, the tray is firmly held by the guide device during the loading operation without play. Consequently, clattering noises are prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A disc player comprising:

a reproducing device;

a magazine storing a plurality of trays, each tray holding a disc therein;

a tray loading arm reciprocating between the magazine and the reproducing device;

a pin provided on the tray loading arm;

a tray guide device operatively engaged with the pin so as to be moved together with the pin;

wherein the tray guide device has a guide plate to be engaged with a first wall of a notch of the tray for moving the tray, and a slide plate attached to said guide plate for engaging with a second wall of the notch of the tray after the guide plate has engaged with the tray to maintain engagement of the guide plate with the tray during movement of the tray thereby suppressing a clattering noise of the tray during movement thereof.

2. A disc player comprising:

a tray loading arm reciprocating between a magazine and a reproducing device;

a pin provided on the tray loading arm;

a tray guide device operatively engaged with the pin so as to be moved together with the pin;

wherein the tray guide device has a guide plate to be engaged with the tray for moving the tray, and a slide plate attached to said guide plate for engaging with the tray to maintain engagement of the guide plate with the tray during movement of the tray;

wherein the guide plate is configured to be engaged with a wall of a notch of the tray, and wherein the slide plate is slidably mounted on the guide plate, said device further comprising a spring for urging the slide plate toward another wall of the notch of the tray, and stopping means for stopping the slide plate at a position apart from the another wall only when the tray is in the magazine.

3. A disc player comprising:

a reproducing device;

a magazine storing a plurality of trays, each tray holding a disc therein;

a tray loading arm reciprocating between the magazine and the reproducing device;

a tray guide device operatively connected with the tray loading arm;

wherein the tray guide device has a guide plate to be engaged with a first wall of a notch of the tray for moving the tray, and a slide plate attached to said guide plate for engaging with a second wall of the notch of the tray after the guide plate has engaged with the tray to maintain engagement of the guide plate with the tray during movement of the tray, thereby suppressing a clattering noise of the tray during movement thereof;

wherein the guide plate and the slide plate are configured such that the guide plate receives a force to be moved in one direction and the slide plate receives another force to be moved in an opposite direction.

4. A disc player comprising:

a reproducing device;

a magazine storing a plurality of trays, each tray holding a disc therein;

a tray loading arm reciprocating between the magazine and the reproducing device;

a tray guide device operatively connected with the tray loading arm;

wherein the tray guide device has a guide plate to be engaged with a first wall of a notch of the tray for moving the tray, and a slide plate attached to said guide plate for engaging with a second wall of the notch of the tray after the guide plate has engaged with the tray to maintain engagement of the guide plate with the tray during movement of the tray, thereby suppressing a clattering noise of the tray during movement thereof;

wherein the guide plate and the slide plate are configured such that both the guide plate and the slide plate do not extend beyond a lateral width of the tray defined in a direction perpendicular to a direction of the movement of the tray.

5. A disc player comprising:

a tray loading arm reciprocating between a magazine and a reproducing device;

a tray guide device operatively connected with the tray loading arm;

wherein the tray guide device has a guide plate to be engaged with the tray for moving the tray, and a slide plate attached to said guide plate for engaging with the tray to maintain engagement of the guide plate with the tray during movement of the tray;

wherein the guide plate and the slide plate are configured such that the guide plate receives a force to be moved in one direction and the slide plate receives another force to be moved in an opposite direction, wherein the guide plate is configured to be engaged with a wall of a notch of the tray and wherein the slide plate is slidably mounted on the guide plate;

said disc player further comprising a spring for urging the slide plate toward another wall of the notch of the tray, and stopping means for stopping the slide plate at a position apart from the another wall only when the tray is in the magazine.

6. A disc player comprising:

a tray loading arm reciprocating between a magazine and a reproducing device;

a tray guide device operatively connected with the tray loading arm;

wherein the tray guide device has a guide plate to be engaged with the tray for moving the tray, and a slide plate attached to said guide plate for engaging with the tray to maintain engagement of the guide plate with the tray during movement of the tray;

wherein the guide plate and the slide plate are configured such that both the guide plate and the slide plate do not extend beyond a lateral width of the tray defined in a direction perpendicular to a direction of movement of the tray, wherein the guide plate is configured to be engaged with a wall of a notch of the tray, and wherein the slide plate is slidably mounted on the guide plate;

said disc player further comprising a spring for urging the slide plate toward another wall of the notch of the tray, and stopping means for stopping the slide plate at a position apart from the another wall only when the tray is in the magazine.

* * * * *